Dec. 25, 1962     E. C. ETTEMA     3,070,717
DEVICE FOR FASTENING A WINDING TO A ROTOR
Filed July 28, 1959

INVENTOR
everhardus catharinus ettema
BY
AGENT

United States Patent Office 3,070,717
Patented Dec. 25, 1962

3,070,717
DEVICE FOR FASTENING A WINDING
TO A ROTOR
Everhardus Catharinus Ettema, Oliemolenstraat Drachten, Netherlands, assignor to North American Philips Company Inc., New York, N.Y., a corporation of Delaware
Filed July 28, 1959, Ser. No. 830,106
Claims priority, application Netherlands Sept. 11, 1958
3 Claims. (Cl. 310—270)

This invention relates to a device for fastening a winding to a rotor, in particular to a rotor of the type in which the slots in which the winding must be accommodated, extend substantially tangentially to the rotor shaft.

In rotors of this type, one limb of one of the coils is located on the bottom of each slot, the other limb of this coil being disposed at the open end of another slot so as to enclose the limb of another coil located on the bottom of this other slot. However, the limbs disposed at the open slot ends must themselves be locked to prevent them from being flung off, and in rotors of this type it was usual to provide groves in the inner walls of the slots near the open ends, into which grooves securing plates could be inserted. However, these grooves involve an attenuation of the magnetic circuit which is inconvenient especially in rotors of small appartus such as, for example, shaving apparatus.

The present invention has for its object to provide a fastening device for the coils of a rotor of the above-mentioned type wh'ch ensures a firm and reliable locking of the winding without attenuation of the magnetic circuit.

According to the invention, this object is attained in that fastening members are slipped onto the shaft so as to engage both end faces of the rotor, each fastening member being provided with radial lugs which are equal in number to the slots and which are bent upwards after the winding has been inserted in the slots so that they engage and lock this winding.

The lengths of the lugs of the fastening members can be made such that the lugs in the non-bent condition project beyond the cylindrical rotor surface to an extent such that they just do not impede the insertion of the former-wound (preformed) coils into the slots.

In order that the invention may readily be carried out, an embodiment thereof will now be described by way of example with reference to the accompanying diagrammatic drawings, in which FIGURE 1 is a plan view of a rotor body with a superposed fastening member the lugs of which have not yet been bent upward, and a sectional view of a preformed coil which is being moved into position in two slots.

A rotor-body 1, which as a rule will be built-up of laminations, is secured to a shaft 2 which for this purpose may be ribbed or splined for part of its length. Fastening members 3 are thrust onto both projecting shaft journals so as to engage the laminated core on both sides.

Figure 3:
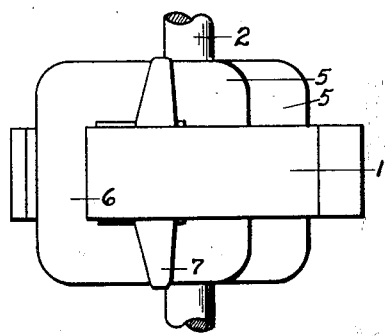
FIGURE 3 is another plan view of a completely assembled rotor with the lugs bent over the form wound coils.

Slots 4 in the rotor-body, in the embodiment shown three in number, serve to receive the rotor winding which comprises a number of former-wound coils 5 equal to the number of slots so that two coil limbs 6 of different coils are disposed in each slot. Two of these limbs 6 are shown in cross-section in FIGURE 1, while one is shown in elevation in FIG. 3.

The two fastening members 3 are star-like bodies of a preferably non-magnetic material having a comparatively high rigidity, for example brass. Preferably, the length of the points of the star is made such that the lug-shaped tips 7 extend slightly beyond the rotor body. Thus, bending of the lugs after the insertion of the winding is facilitated. The remainder of the members 3 is shaped so that the slots 4 are kept completely clear.

Figure 1:
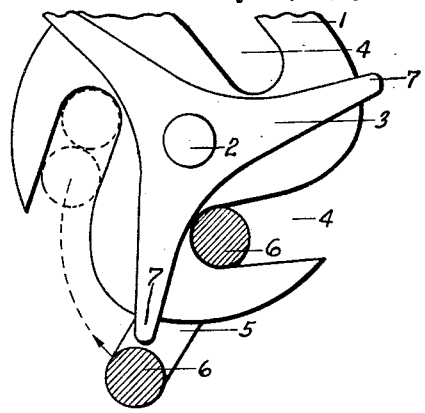
Figure 2:
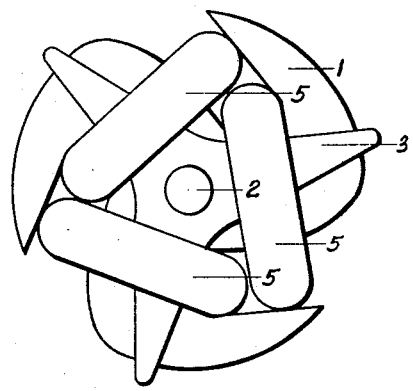
FIGURE 2 is the same plan-view after all the form-wound coils have been moved into position but before the lugs of the fastening member have been bent upward.

One leg of each of the three coils is disposed on the bottom of the slots, after which the coils are swung about these limbs in the direction of the arrow shown in FIG. 1, so that the other limbs become located in the slots near the open ends thereof and enclose the limbs disposed on the bottoms of these slots. This position of the coils is shown in FIG. 2.

In this final position the coils can be locked in a very simple and effective manner by bending the lugs 7 upward to engage the coils. With the small size rotors usual in small apparatus such as shaving apparatus, the thickness of the brass lugs need not exceed 0.3 mm. This provides a rigidity of the luges sufficient to prevent them from being bent back by the outward pressure exerted upon them by the coils during rotation of the rotor.

Although it is desirable for the lugs 7 to project beyond the rotor body in their non-bent condition, the extent of the projection must be kept within a certain limit. This limit is defined by the requirement that the coils must be enabled to swing past the lug tips, as is shown in FIG. 1.

The coil fastening according to the invention is not only effective and reliable but can also be manufactured readily, rapidly and cheaply, while furthermore the rotor body proper can be left entirely intact since no provision need be made of grooves or the like which weaken the flux.

What is claimed is:

1. A rotor comprising a shaft member, a rotor body secured on said shaft and having a plurality of spaced circumferential slots, fastening members having a centrally located aperture receiving said shaft, said fastening members abutting each end face of said rotor body, said fastening members having a plurality of radial lugs means extending beyond the rotor body in a radial plane and equal in number to the number of slots of said rotor, preformed coil members within each said rotor slot in overlapped relation, and the overlapped coil members in each said slot overlying a separate lug of each said fastening member, said lug means being bent over the associated coil member securing said coil members in the slots of said rotor.

2. A rotor for miniature electric motors comprising a rotor body having a plurality of circumferentially spaced tangential slots, a fastening plate having a plurality of radially extending arms abutting the end faces of said rotor, a discrete loop shaped winding within each of said slots and the next adjacent slot whereby each said slot has juxtaposed portions of paired windings in each said slot and each said paired windings between said adjacent slots is angularly spaced, each said discrete winding overlying a separate arm of said fastening plates, and each arm of said fastening plates being bent over the portion of said winding associated therewith to secure said windings in said rotor slots.

3. A rotor for miniature electric motors comprising a rotor body having circumferentially spaced tangential slots, a fastening plate abutting the end faces of said rotor and having a plurality of radially extending lugs of a length greater than the diameter of said rotor, a plurality of loop shaped windings operatively associated with said rotor, the adjacent ones of said windings having portions within said slots in juxtaposition and the portions of said adjacent windings transversely of said end faces overlying separate lugs of said fastening plate, said lugs being bent over the associated winding to fasten said windings in said slots.

References Cited in the file of this patent

UNITED STATES PATENTS

| | | |
|---|---|---|
| 2,465,820 | Sharrow et al. | Mar. 29, 1949 |
| 2,615,944 | Carlson | Oct. 28, 1952 |
| 2,970,237 | Kent | Jan. 31, 1961 |
| 2,972,449 | Roberts | Feb. 21, 1961 |

FOREIGN PATENTS

| | | |
|---|---|---|
| 1,175,284 | France | Mar. 23, 1959 |